United States Patent [19]
Collins et al.

[11] Patent Number: 5,374,678
[45] Date of Patent: Dec. 20, 1994

[54] ADHESIVE

[75] Inventors: Peter J. Collins; Michael J. Delaney; Yoshikazu Yazaki, all of Melbourne, Australia

[73] Assignees: Commonwealth Scientific & Industrial Research Organization, Melbourne; Huntsman Chemical Company Australia Limited, Victoria, both of Australia

[21] Appl. No.: 5,936

[22] Filed: Jan. 15, 1993

Related U.S. Application Data

[63] Continuation of Ser. No. 690,986, Jun. 18, 1991, abandoned.

[30] Foreign Application Priority Data

Nov. 25, 1988 [AU] Australia ............................ PJ1644
Jul. 28, 1989 [AU] Australia ............................ PJ5518

[51] Int. Cl.$^5$ ................... C08L 61/00; B05D 3/00; B27D 1/00; B32B 31/00
[52] U.S. Cl. ............................ 524/595; 524/594; 525/480; 525/491; 525/501; 427/325; 156/281; 156/314; 144/348; 144/352
[58] Field of Search ............... 524/204, 205, 219, 236, 524/252, 594, 595, 13, 15, 35, 435, 447; 525/491, 501, 480; 427/325; 156/281, 314; 144/348, 352

[56] References Cited

U.S. PATENT DOCUMENTS

| | | | |
|---|---|---|---|
| 3,215,653 | 11/1965 | Hugher | 260/17.2 |
| 3,254,038 | 5/1966 | Duncan et al. | 260/17.2 |
| 3,713,943 | 1/1973 | Huff | 427/325 |
| 3,929,695 | 12/1975 | Murata et al. | 4525/480 |
| 4,661,412 | 4/1987 | Bornstein et al. | 524/595 |
| 4,678,532 | 7/1987 | Perry et al. | 427/325 |

FOREIGN PATENT DOCUMENTS

| | | | |
|---|---|---|---|
| 5081785 | 6/1986 | Australia . | |
| 1060388 | 7/1988 | Australia . | |
| 573578 | 4/1959 | Canada | 524/595 |
| 578089 | 6/1959 | Canada | 525/480 |
| 3316352A1 | 11/1984 | Germany . | |
| 723884 | 2/1955 | United Kingdom . | |
| 819044 | 8/1959 | United Kingdom . | |

*Primary Examiner*—Paul R. Michl
*Assistant Examiner*—LaVonda R. DeWitt
*Attorney, Agent, or Firm*—Merchant, Gould, Smith, Edell, Welter & Schmidt

[57] ABSTRACT

A wood adhesive composition including an effective amount of a phenol-formaldehyde resin; and a modifying agent which agent renders the composition capable of bonding to a hard wood.

13 Claims, No Drawings

ADHESIVE

This is a continuation, of application Ser. No. 07/690,986, filed Jun. 18, 1991 now abandoned.

The present invention relates to adhesive compositions and especially to adhesive compositions used in the manufacture of wood products. In particular the invention relates to improved phenolic-type adhesives useful in the manufacture of plywood, but the invention is also applicable to other adhesive types and to the manufacture of other reconstituted wood products.

More particularly the adhesive compositions of the present invention are useful as adhesives in the manufacture of plywood utilising relatively high density wood materials, such as, for example, certain eucalypt species.

Since the availability of the more traditional wood species, such as those obtained from rain forests is becoming increasingly less, particularly for use in plywood manufacture owing to ecological reasons, some plywood manufacturers must turn their attention to the use of high density species, particularly eucalypt species, as substitutes for the more traditional rain forest species.

Reconstituted wood manufacturers have found difficulties in bonding wood species of relatively high density or containing certain extractives known to make these species more difficult to bond with traditional phenolic type adhesives. For example, it has been found that traditional phenolic resins produce poor adhesive bonds with plywood manufactured from high density eucalypt species, such as for example Blackbutt (Eucalyptus pilularis). Extractives present in the wood and bark of certain species and known to inferfere with the glueability of wood include polyphenolic compounds such as ellagitannins and certain organic acids, but the range of interfering substances is not restricted to these classes of compound.

We have found that the inferior bonding of these species with traditional phenolic adhesives is caused predominently by interaction between extractives contained within the wood or bark and the phenolic resin thus affecting the ability of the phenolic resin to produce a strong and durable glueline.

It is accordingly an object of the present invention to overcome, or at least alleviate, one or more of the difficulties related to the prior art.

Accordingly, in a first aspect of the present invention there is provided a wood adhesive composition including an effective amount of a phenol-formaldehyde resin; and a modifying agent which agent renders the composition capable of bonding to a hard wood.

The wood adhesive composition according to the present invention has been found to be useful in the manufacture of wood products, including reconstituted wood products of various types. For example, the wood adhesive composition according to the present invention may be utilised in the manufacture of plywoods and similar laminated wood products as well as in products based on wood veneers. The wood adhesive composition according to the present invention has been found to be particularly suitable for the manufacture of Type A waterproof plywoods, i.e. plywoods which are fully weather- and boil-proof (WBP plywoods).

The wood adhesive composition according to the present invention may be applied to wood species of relatively high density or containing certain extractives known to make the species more difficult to bond with traditional phenolic adhesives. As used herein in the description and claims, the term "hard wood" is used to denote such wood species.

The phenol formaldehyde (PF) resin utilised in the wood adhesive composition according to the present invention may be of any suitable type. A phenol formaldehyde resin having a low free formaldehyde content is preferred. The free formaldehyde content may range from 0 to approximately 2%, more preferably from 0 to 0.5%. Phenol formaldehyde resins having a low free formaldehyde content are available commercially from various sources including Chemplex Australia, Borden Chemicals and ICI. Preferred phenol formaldehyde resins are alkaline catalysed phenol formaldehyde resins. A suitable alkaline phenol formaldehyde resin is the resin sold under the trade designation Chemplex 775.

The phenol formaldehyde resin may be present in the wood adhesive composition in any effective amounts. The phenol formaldehyde resin may be present in amounts of from approximately 50 to 99.99% by weight, preferably approximately 90 to 99.95% by weight, more preferably approximately 90 to 99% by weight, based on the total weight of the wood adhesive composition, exclusive of any filler content. More preferably, the phenol formaldehyde resin is present in amounts of from approximately 95 to 99.9% by weight.

In a preferred aspect of the present invention there is provided a wood adhesive composition including an effective amount of a phenol-formaldehyde resin; and a modifying agent which is difunctional or multifunctional and capable of reacting with either an aldehyde or methylol group.

Preferably said modifying agent is selected from the group consisting of meta-amino-phenol, resorcinol, phloroglucinol, phenolic novolacs, condensed tannins, polymers manufactured therefrom, or mixtures thereof.

Typical modifying agents useful in this wood adhesive composition according to this aspect of the present invention are phenolic novolacs especially high orthonovolacs such as used in the production of moulding powders, for example as is described in U.S. Pat. Nos. 2,475,581 (Dec. 7, 1949) or 3,476,707 (Apr. 11, 1969), meta-amino-phenol, resorcinol, phloroglucinol, para amino phenol, resorcinol and resorcinol phenol resins and ether such suitable compounds known to be very reactive to methylol phenol known in the art. These modifying agents may be useful alone or preferably a combination of phenolic novolac together with another curing agent may be used.

The modifying agent may be present in any effective amount. The amount to be added is dependent on the formaldehyde to phenol ratio and the methylol content of the base resin. Resins containing high formaldehyde to phenol ratios and large percentages of methylol groups require relatively large amounts of novolac or other reactive to methylol compounds to be added. The amount of modifying agent may range from approximately 0.01 to 50% by weight, preferably 0.05 to 10% by weight, more preferably approximately 0.1 to 5% by weight, based on the total weight of the wood adhesive composition, excluding fillers when present.

A phenolic resin having a F/P ratio of 1:1.5 and containing mostly methylene linkages and thus low methylol content would require very low amounts of, for example, meta amino phenol to be added for complete reaction. This amount is usually less than approximately 3 parts of meta amino phenol per 100 parts of resin.

The amount of modifying agent to be added may be determined by gelation time experiments in which increasing amounts of a likely compound are added until the gelation time of the mixture begins to rapidly lengthen which is an indication of insufficient methylol remaining. Single or combinations of suitable compounds may be added.

It has been found that the point at which rapid lengthening of the gelation time is observed is related to the total molar content of modifying agent. Thus provided the total number of moles is kept constant, a combination of two or more modifying agents may be used to achieve a desired gelation time. For example, the gelation time of a mixture of phenolic resin and meta-aminophenol was found to increase rapidly after the addition of more than 0.96 gm per 100 pts resin solution. The same increase in gelation time could be observed when equal parts (0.48 g +0.48 g) of resorcinol and meta-amino-phenol were added in combination (as their molecular weights are essentially equal at 110 and 109 respectively). The same occurs with other compounds, for example such as novolacs and for instance phloroglucinol and polymers such as resorcinol formaldehyde.

Accordingly, in a preferred aspect there is provided a wood adhesive composition including approximately 50 to 99.99%, preferably 90 to 99.95% by weight based on the total weight of the wood adhesive composition, excluding fillers, of a phenol-formaldehyde resin having a low free formaldehyde content; and approximately 0.01 to 50%, preferably approximately 0.05 to 10% by weight based on the total weight of the wood adhesive composition, excluding fillers, of one or more modifying agents.

A typical wood adhesive composition according to this aspect of the present invention includes approximately 94 to 97.25% by weight based on the total weight of the wood adhesive composition, excluding fillers, of a phenol-formaldehyde resin having a low free-formaldehyde content;

approximately 2.5 to 5% by weight based on the total weight of the wood adhesive composition, excluding fillers, of a phenolic novolac resin; and approximately 0.25 to 1% by weight based on the total weight of the wood adhesive composition, excluding fillers, of meta-amino phenol.

In an alternative preferred aspect of the present invention there is provided a wood adhesive composition including an effective amount of a phenol formaldehyde resin; and an extractives neutralising agent capable, in use, of reducing or eliminating the adverse effects of extractives contained in a hard wood.

This aspect of the present invention involves the addition of an extractives neutralising agent to the adhesive and/or the treatment, with these compounds, of the substrate to be glued. These compounds interact with the extractives within the wood or bark and substantially negate the deleterious effect of the extractives so that superior adhesive performance is obtained.

Preferably, the extractives neutralising agent is capable of forming complexes with and/or precipitating the extractives, thereby substantially inactivating the extractives so as to minimise interference with the bonding action, particularly at the glueline.

Accordingly in a preferred form of this aspect of the present invention there is provided a wood adhesive composition including approximately 90 to 99.95% by weight based on the total weight of the wood adhesive composition, excluding fillers, of a phenol-formaldehyde resin; and approximately 0.05% to 10% by weight based on the total weight of the wood adhesive composition, excluding fillers, of an extractives neutralising agent selected from metallic compounds and organic compounds capable of forming precipitates and/or complexes with extractives contained in a hard wood.

Preferably the extractives neutralising agent is selected from metallic compounds of metals selected from the group consisting of copper, iron, zinc, lead, manganese and nickel and organic compounds selected from the group consisting of hexamethylenetetramine, melamine, ethylenediaminetetraacetic acid (EDTA), triethylenetetramine, and complexes thereof.

It will be understood that the invention may function as follows. For example, the wood extractive, the polyphenolic compound ellagitannin, forms precipitates and/or complexes with derivatives of metals such as copper, iron, zinc, manganese, nickel etc and with organic compounds such as urea, melamine, hexamine and EDTA. Complex formation is thought to be due mainly to the existence in the extractives of polyphenolic compounds containing ortho-diphenol units such as catechol and pyrogallol. Monomeric and oligomeric catechols and pyrogallols may also be present. We have found for example that the major compounds in the extractives of Blackbutt wood are polyphenolic compounds (ellagitannins) which are classified as pyrogallol type compounds.

The extractives neutralising agent inactivating compound may be inorganic or organic. Typical inorganic compounds useful in the present invention are metallic compounds such as copper, iron, zinc, lead, manganese, nickel, and the like, derivatives and particularly inorganic and organic salts of metals which can precipitate or complex extractives present in wood or bark. Examples of organic compounds suitable in the present invention are hexamethylenetetramine (hexamine), melamine, ethylenediamine-tetraacetic acid (EDTA), triethylenetetramine (Trien), and derivatives thereof capable of precipitating and/or complexing extractives which interfere with the bonding action.

It is also known that some wood extractives form precipitates with a variety of organic compounds including aldehydes and ketones (e.g. vanillin, cinnamaldehyde), simple nitrogen containing compounds (e.g. urea, acetamide) and heterocyclic ring compounds (e.g. quinoline, pyridine). Other compounds that are able to react and/or interact with extractives and to suppress the reaction between the wood extractives and the adhesive are also suitable additives.

A single inactivating compound or combination of such compounds may be used.

We have found that the extractives from Blackbutt wood are precipitated from solution on the addition of metallic derivatives such as the ions of copper, iron, zinc, lead etc.

We have also found that the extractives from Blackbutt wood are precipitated from their aqueous solution over a range of pHs from 0 to 14 by the addition of organic compounds such as EDTA and Trien and/or their metallic derivatives such as their copper, zinc, iron and lead derivatives. In this way, deleterious extractives in the wood can be effectively excluded from the gluing system so that blocking of, or interference with, the curing of the phenolic adhesive by the extractives is prevented and high quality bonding is obtained.

A particularly useful compound for the practice of the invention is cupric disodium ethylenediaminetetra-acetate (EDTA.Cu.Na$_2$). Further useful compounds include ferric chloride (FeCl$_3$), zinc acetate, EDTA.Cu, Trien-Cu, (Cu-Trien) ZnCl$_4$. Mixtures of compounds may also be used, for example acetylacetone and Trien.

The desired level of addition is related to the amount of extractives to be inactivated but in general a suitable concentration of the metallic or organic component is in the range of 0.05 to 10% by weight based on the total weight of the wood adhesives composition, excluding fillers, where present, more preferably approximately 2 to 5% by weight.

Accordingly, in a preferred aspect there is provided a wood adhesive composition including
approximately 95 to 98% by weight based on the total weight of the wood adhesive composition, excluding fillers, of a phenol-formaldehyde resin; and
approximately 2 to 5% by weight based on the total weight of the wood adhesive composition, excluding fillers, of an extractives modifying agent selected from the group consisting of ferric chloride and cupric disodium ethylene diaminetetraacetate.

The compositions of the invention may also contain other additives and suitable filler materials such as methyl propyl cellulose, wood flour, shell flour, calcite or kaolin. The filler may be present in amounts as conventionally used of from approximately 1 to 67% by weight based on the total weight of the wood adhesive composition, preferably 5 to 40% by weight. Alkalis and water may be added as necessary for viscosity adjustment.

In accordance with a further aspect of the present invention there is provided a method for preparing a plywood article which method includes
providing
a first wood sheet;
at least one second wood sheet; and
a wood adhesive composition including an effective amount of
a phenol-formaldehyde resin; and
a modifying agent which agent renders the composition capable of bonding to a hard wood;
coating a portion of a surface of said first wood sheet with the wood adhesive composition; and
contacting the surface of the second wood sheet with the coated surface of the first wood sheet.

Preferably, the wood adhesive composition includes approximately 94 to 97.25% by weight based on the total weight of the wood adhesive composition, excluding fillers, of a phenol-formaldehyde resin having a low free-formaldehyde content;
approximately 2.5 to 5% by weight based on the total weight of the wood adhesive composition, excluding fillers, of a phenolic novolac resin; and
approximately 0.25 to 1% by weight based on the total weight of the wood adhesive composition, excluding fillers, of meta-amino phenol.

Alternatively, the wood adhesive composition includes approximately 95 to 98% by weight based on the total weight of the wood adhesive composition, excluding fillers, of a phenol-formaldehyde resin; and
approximately 2 to 5% by weight based on the total weight of the wood adhesive composition, excluding fillers, of an extractives modifying agent selected from the group consisting of ferric chloride and cupric disodium ethylene diaminetetraacetate.

The first and subsequent wood sheets utilised in the preparation of the plywood article according to the method according to the present invention may be of any suitable type. The wood sheets may be formed of wood species of relatively high density such as high density eucalypt species. A particularly preferred form is Blackbutt wood (Eucalyptus pilularis).

The method of preparing the plywood article may be undertaken utilising standard techniques. For example, once the coated surface of the first wood sheet has been contacted with the surface of the second wood sheet, standard bonding steps including applying heat and/or pressure to the sheet so as to effect bonding of the two sheets may be undertaken.

In an alternative method, however, the wood sheets or other articles to be bonded may first be treated with the extractives neutralising agent so as to reduce or eliminate the adverse effects of extractives contained in the hard wood. Once this preliminary treatment is completed, the sheets may then be treated with a standard wood adhesive composition including a phenol formaldehyde resin.

Accordingly, there is provided a method for preparing a plywood article which method includes
providing
a first hard wood sheet;
at least one wood sheet; and
a wood adhesive kit including
a primer coating composition including an extractives neutralizing agent capable, in use, of reducing or eliminating the adverse effects of extractives contained in a hard wood; and treating a surface of said first sheet to be adhered with said primer coating composition; and
contacting said treated surface with the wood adhesive composition.

Accordingly, in a still further aspect of the present invention there is provided a wood adhesive kit including
a primer coating composition including an extractives neutralizing agent capable, in use, of reducing or eliminating the adverse effects of extractives contained in a hard wood; and
a wood adhesive composition including
a phenol formaldehyde resin.

Preferably, the primer coating composition includes an extractives neutralizing agent selected from ferric chloride and cupric disodium ethylene diaminetetraacetate.

The present invention will now be more fully described with reference to the accompanying examples. It should be understood, however, that the description following is illustrative only and is not intended to restrict the generality of the invention as described above.

EXAMPLE 1

A conventional suitable alkaline phenol formaldehyde base resin is selected such as Chemplex 775, to this is added a suitable novolac such as supplied by Chemplex Australia Ltd., for example GC 1499 (3%) and meta-amino phenol (0.4%) and suitable filler materials such as methyl propyl cellulose, nut shell flour, calcite and kaolin. Alkalis and water may be added as necessary for viscosity adjustment.

The results of tests utilizing the compositions of the present invention indicate that an adhesive system has been developed that will satisfy the glue bond requirements for Type A bonded plywood from high density eucalypts using the chisel test as described in Australian Standards 2098.2 (1977) and 2754.1 (1985). The adhesive system may be easily mixed on site, each part having adequate storage life, but upon mixing producing adhesives of faster cure time, and controlled penetration by reduction of extractive interference resulting in the reduction of cohesive failure.

EXAMPLE 2

Plywood samples were prepared by bonding veneers from Blackbutt (Eucalyptus pilularis) as a representative high density wood species. The adhesive formulation consisted of Chemplex 775 (100 parts) as a suitable conventional alkaline phenol-formaldehyde resin, a nut shell flour (10 parts) and calcite (10 parts) as fillers, and cupric disodium ethylenediaminetetraacetate (EDTA.-$CuNa_2$) (4 parts). The same formulation with the cupric disodium ethylenediaminetetraacetate omitted was used as a control.

The bond quality of the resulting plywood specimens was then assessed by the chisel test according to Australian Standards 2098.2 (1977) and 2754.1 (1985). The test results are summarised in Table 1.

TABLE 1

| Adhesive formulation | Gluing Test Results Average gluebond quality | |
|---|---|---|
| | Dry | Wet after 72 hours boiling |
| EDTA.Cu.$Na_2$ | 8.0 | 9.0 |
| Control | 3.0 | 2.0 |

EXAMPLE 3

Plywood samples were prepared in accordance with the procedure described in Example 2. The adhesive formulation used here consisted of Chemplex 775 (100 parts), a nut shell flour (15 parts), kaolin (10 parts) and $FeCl_3$ (2.2 parts). The test procedures used are those described in Example 2. Table 2 gives the test results.

TABLE 2

| Adhesive formulation | Gluing Test Results Average gluebond quality | |
|---|---|---|
| | Dry | Wet after 72 hours boiling |
| $FeCl_3$ | 8.0 | 8.0 |

The results show that the adhesive system of this invention satisfies the gluebond requirements for Type A bonded plywood (fully weather and boil proof), whereas the conventional system does not meet the requirements of the standards.

Finally, it is to be understood that various other modifications and/or alterations may be made without departing from the spirit of the present invention as outlined herein.

We claim:

1. A wood composition including:
   (a) approximately 94 to 97.25% by weight, based on the total weight of the wood adhesive composition, excluding fillers, of a phenol-formaldehyde resin having a free-formaldehyde content of no more than 2%;
   (b) approximately 2.5 to 5% by weight, based on the total weight of the wood adhesive composition, excluding fillers, of a phenolic novolac resin; and
   (c) approximately 0.25 to 1% by weight based on the total weight of the wood adhesive composition, excluding fillers, of meta amino-phenol, with the proviso that no free formaldehyde is added to the wood adhesive composition.

2. A wood adhesive composition according to claim 1 including approximately 1 to 67% by weight, based on the total weight of the composition of a filler selected from the group consisting of methyl propyl cellulose, wood flour, nut shell flour, calcite, kaolin and mixtures thereof.

3. A wood adhesive composition including:
   (a) approximately 90 to 99.99% by weight based on the total weight of the wood adhesive composition, excluding fillers, of a phenol-formaldehyde resin having a free formaldehyde content of no greater than about 2%; and
   (b) approximately 0.05 to 10% by weight based on the total weight of the wood adhesive composition, excluding fillers, of an extractives neutralizing agent selected from metallic compounds of metals selected from the group consisting essentially of: copper, iron, zinc, lead, manganese and nickel and organic compounds selected from the group consisting essentially of: ethylenediamine tetraacetic acid, triethylene tetramine, and complexes thereof wherein the metallic compounds and organic compounds are capable of forming precipitates and/or complexes with extractives contained in a hard wood, with the proviso that no free formaldehyde is added to the wood adhesive composition.

4. A composition according to claim 3 including an effective amount, up to 67% based on the total weight of the composition, of a filler selected from the group consisting of methyl propyl cellulose, wood flour, nut shell flour, calcite, kaolin and mixtures thereof.

5. A wood adhesive composition including:
   (a) approximately 95 to 98% by weight based on the total weight of the wood adhesive composition, excluding fillers, of a phenol-formaldehyde resin having a free formaldehyde content of no more than 2%; and
   (b) approximately 2 to 5% by weight based on the total weight of the wood adhesive composition, excluding fillers, of an extractives neutralizing agent selected from the group consisting of ferric chloride and cupric disodium ethylene diamine tetraacetate, with the proviso that no free formaldehyde is added to the wood adhesive composition.

6. A wood adhesive composition according to claim 5 including approximately 1 to 67% based on the total weight of the composition of a filler selected from the group consisting of methyl propyl cellulose, wood flour, nut shell flour, calcite, kaolin and mixtures thereof.

7. A method for preparing a plywood article which method includes:
   (a) providing:
      (i) a first hard wood sheet;
      (ii) at least a second wood sheet; and
      (iii) a wood adhesive composition including:

(A) approximately 90 to 99.99% by weight based on the total weight of the wood adhesive composition, excluding fillers, of a phenol-formaldehyde resin having a free formaldehyde content of no more than about 2%; and
(B) approximately 0.01 to 10% by weight based on the total weight percent of the wood adhesive composition, excluding fillers, of a modifying agent which is difunctional or multifunctional and capable of reacting with either an aldehyde or methylol group, said modifying agent being selected from the group consisting of meta amino-phenol, resorcinol, phloroglucinol, phenolic novolacs, polymers manufactured therefrom, and mixtures thereof; with the proviso that no free formaldehyde is added to the wood adhesive composition;
(b) coating a portion of a surface of said first wood sheet with the wood adhesive composition; and
(c) contacting the surface of the second wood sheet with the coated surface of the first wood sheet.

8. A method according to claim 7 wherein:
(a) the wood adhesive composition includes approximately 94 to 97.25% by weight, based on the total weight of the wood adhesive composition, excluding fillers, of the phenol-formaldehyde resin having a free formaldehyde content of no more than 2%;
(b) approximately 2.5 to 5% by weight, based on the total weight of the wood adhesive composition, excluding fillers, of a phenolic novolac resin; and
(c) approximately 0.25 to 1% by weight, based on the total weight of the wood adhesive composition, excluding fillers, of a meta amino-phenol.

9. A method for preparing a plywood article which method includes:
(a) providing:
(i) a first hard wood sheet;
(ii) at least a second wood sheet; and
(iii) a wood adhesive composition comprising:
(A) approximately 90% to 99.95% by weight, based on the total weight of the wood adhesive composition, excluding fillers, of a phenol-formaldehyde resin having a free formaldehyde content of no greater than about 2%;
(B) approximately 0.05% to 10% by weight, based on the total weight of the wood adhesive composition, excluding fillers, of an extractives neutralizing agent selected from metallic compounds of metals selected from the group consisting essentially of: copper, iron, zinc, lead, manganese and nickel and organic compounds selected from the group consisting essentially of: ethylene-diamine tetraacetic acid, triethylene tetramine, and complexes thereof wherein the metallic compounds and organic compounds are capable of forming precipitates and/or complexes with extractives contained in a hard wood; and
(C) an effective amount up to 67% by weight, based on the total weight of the composition, of a filler selected from the group consisting of methyl propyl cellulose, wood flour, nut shell flour, calcite, kaolin and mixtures thereof; with the proviso that no free formaldehyde is added to the wood adhesive composition;
(b) coating a portion of a surface of said first wood sheet with the wood adhesive composition; and
(c) contacting the surface of the second wood sheet with the coated surface of the first wood sheet.

10. A method according to claim 9 wherein the wood adhesive composition includes:
(a) approximately 95 to 98% by weight based on the total weight of the wood adhesive composition, excluding fillers, of the phenol-formaldehyde resin; and
(b) approximately 2 to 5% by weight based on the total weight of the wood adhesive composition, excluding fillers, of the extractives neutralizing agent selected from the group consisting of ferric chloride and cupric disodium ethylene diaminetetraacetate.

11. A wood adhesive kit including:
(a) a primer coating composition including an extractives neutralizing agent selected from metallic compounds of metals selected from the group consisting essentially of: copper, iron, zinc, lead, manganese and nickel, and organic compounds selected from the group consisting essentially of: ethylenediamine tetraacetic acid, triethylene tetramine, and complexes thereof wherein the metallic compounds and organic compounds are capable of forming precipitates and/or complexes with extractives contained in a hard wood, with the proviso that no free formaldehyde is added to the wood adhesive composition; and
(b) a wood adhesive composition including:
(i) a phenol formaldehyde resin having a free formaldehyde content of no greater than 2%.

12. A wood adhesive kit according to claim 11 wherein the primer coating composition includes an extractives neutralizing agent selected from ferric chloride and cupric disodium ethylene diaminetetraacetate.

13. A method for preparing a plywood article which method includes:
(a) providing:
(i) a first hard wood sheet;
(ii) at least a second wood sheet; and
(iii) a wood adhesive kit including:
(A) a primer coating composition including an extractives neutralizing agent selected from metallic compounds of metals selected from the group consisting essentially of: copper, iron, zinc, lead, manganese and nickel and organic compounds selected from the group consisting essentially of: ethylenediamine tetraacetic acid, triethylene tetramine, and complexes thereof wherein the metallic compounds and organic compounds are capable of forming precipitates and/or complexes with extractives contained in a hard wood, with the proviso that no free formaldehyde is added to the wood adhesive composition; and
(B) a wood adhesive composition including a phenol formaldehyde resin having a free formaldehyde content of no greater than 2%;
(b) treating a surface of at least said first sheet to be adhered with said primer coating composition;
(c) coating a portion of said treated surface with the wood adhesive composition;
(d) contacting the surface of the at least one wood sheet with the coated surface of the first hard wood sheet; and
(e) bonding the first hard wood sheet to the at least one wood sheet.

* * * * *

UNITED STATES PATENT AND TRADEMARK OFFICE
CERTIFICATE OF CORRECTION

PATENT NO. : 5,374,678

DATED : Dec. 20, 1994

INVENTOR(S) : Collins et al.

It is certified that error appears in the above-identified patent and that said Letters Patent is hereby corrected as shown below:

On Title page, in [63], line Foreign Data, insert --PCT/AU89-00514, Nov. 24, 1989--.

On Title page, in [63], line Foreign Data, insert --WO90/06347, June 14, 1990--.

In column 2, line 48, "ether" should be --other--.

Signed and Sealed this

Tenth Day of September, 1996

Attest:

BRUCE LEHMAN

*Attesting Officer*       *Commissioner of Patents and Trademarks*